United States Patent
Hwang et al.

(10) Patent No.: US 8,121,537 B2
(45) Date of Patent: Feb. 21, 2012

(54) APPARATUS AND METHOD FOR UPLINK CHANNEL SOUNDING IN A WIRELESS COMMUNICATION SYSTEM

(75) Inventors: Keun-Chul Hwang, Seongnam-si (KR); Sung-Woo Park, Suwon-si (KR)

(73) Assignee: Samsung Electronics Co., LTD (KR)

( * ) Notice: Subject to any disclaimer, the term of this patent is extended or adjusted under 35 U.S.C. 154(b) by 1231 days.

(21) Appl. No.: 11/758,516

(22) Filed: Jun. 5, 2007

(65) Prior Publication Data

US 2007/0280340 A1 Dec. 6, 2007

(30) Foreign Application Priority Data

Jun. 5, 2006 (KR) ................. 10-2006-0050159

(51) Int. Cl.
| | |
|---|---|
| H03C 7/02 | (2006.01) |
| H04B 7/00 | (2006.01) |
| H04B 7/02 | (2006.01) |
| H04B 7/185 | (2006.01) |
| H04B 17/02 | (2006.01) |
| H04B 1/06 | (2006.01) |
| H04B 7/005 | (2006.01) |
| H04B 1/44 | (2006.01) |
| H04J 11/00 | (2006.01) |
| H04J 1/00 | (2006.01) |
| H04W 4/00 | (2009.01) |
| H04K 1/10 | (2006.01) |
| H04L 27/28 | (2006.01) |
| H04L 1/02 | (2006.01) |
| H03D 3/22 | (2006.01) |

(52) U.S. Cl. .... 455/13.3; 455/101; 455/273; 455/277.1; 455/137; 455/69; 375/267; 375/260; 375/332; 375/334; 370/277; 370/210; 370/278; 370/281; 370/282; 370/341; 370/343

(58) Field of Classification Search .................. 455/101, 455/277.1, 13.3, 137, 273, 69; 375/267, 375/260, 332, 334; 370/277, 210, 278, 281, 370/282, 341, 343
See application file for complete search history.

(56) References Cited

U.S. PATENT DOCUMENTS

| | | | | |
|---|---|---|---|---|
| 6,483,814 | B1* | 11/2002 | Hsu et al. | 370/277 |
| 7,359,679 | B2* | 4/2008 | King et al. | 455/101 |
| 7,764,744 | B2* | 7/2010 | Choi et al. | 375/267 |
| 2005/0170781 | A1* | 8/2005 | Jacobsen et al. | 455/67.11 |
| 2006/0009176 | A1* | 1/2006 | Saunders et al. | 455/137 |
| 2006/0034165 | A1* | 2/2006 | Levy | 370/208 |

(Continued)

FOREIGN PATENT DOCUMENTS

KR 2020000011891 7/2000

(Continued)

*Primary Examiner* — Temesgh Ghebretinsae
*Assistant Examiner* — Bobbak Safaipour
(74) *Attorney, Agent, or Firm* — The Farrell Law Firm, P.C.

(57) ABSTRACT

An uplink channel sounding apparatus and method in a wireless communication system are provided, in which in an MS, a baseband MODEM generates as many channel sounding signals as the MS has antennas and outputs the channel sounding signals to an antenna switch. The antenna switch switches the channel sounding signals to the antennas in a one-to-one basis transmitting the channel sounding signals to a BS through all of the antennas of the MS.

15 Claims, 11 Drawing Sheets

U.S. PATENT DOCUMENTS

| | | | |
|---|---|---|---|
| 2006/0120476 A1* | 6/2006 | Li et al. | 375/267 |
| 2006/0172711 A1* | 8/2006 | King et al. | 455/101 |
| 2008/0188186 A1* | 8/2008 | Hwang et al. | 455/69 |
| 2009/0054093 A1* | 2/2009 | Kim et al. | 455/500 |
| 2010/0009707 A1* | 1/2010 | Porat | 455/517 |
| 2010/0202372 A1* | 8/2010 | Chun et al. | 370/329 |

FOREIGN PATENT DOCUMENTS

| | | |
|---|---|---|
| KR | 1020080073191 | 8/2008 |
| WO | WO 2005/067170 | 7/2005 |

* cited by examiner

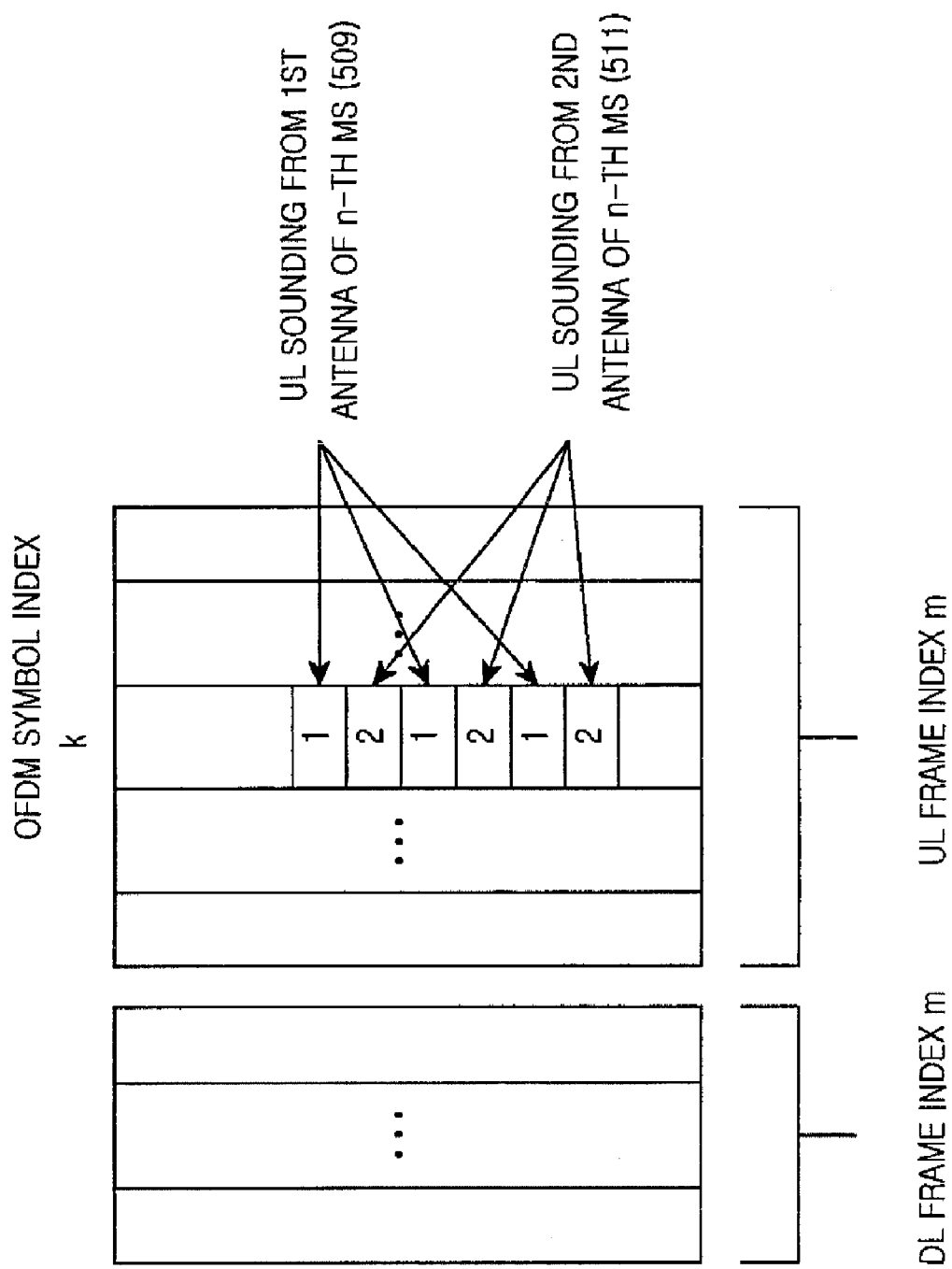

APPARATUS AND METHOD FOR UPLINK CHANNEL SOUNDING IN A WIRELESS COMMUNICATION SYSTEM

PRIORITY

This application claims priority under 35 U.S.C. §119 to an application filed in the Korean Intellectual Property Office on Jun. 5, 2006, entitled "Apparatus and Method for Uplink Channel Sounding in a Wireless Communication System" and assigned Serial No. 2006-50159, the contents of which are incorporated herein by reference.

BACKGROUND OF THE INVENTION

1. Field of the Invention

The present invention relates generally to a wireless communication system, and in particular, to an apparatus and method for uplink channel sounding.

2. Description of the Related Art

Multiple-Input Multiple-Output (MIMO) is under intense study as one of the promising technologies for high-speed data transmission.

MIMO techniques are categorized into open-loop MIMO and closed-loop MIMO. In open-loop MIMO techniques, including Space-Time Coding (STC) and Vertical-Bell Labs Layered Space-Time (V-BLAST), a transmitter transmits data without knowledge of channel information. In closed-loop MIMO techniques, such as Singular Value Decomposition (SVD) and Spatial Division Multiple Access (SDMA), the transmitter acquires channel information and transmits data based on the channel information.

How the transmitter acquires the channel information depends on the duplexing mode. In Frequency Division Duplexing (FDD), a receiver measures the channel and feeds back the measured channel information to the transmitter. In Time Division Duplexing (TDD), the receiver transmits channel sounding signals to the transmitter and the transmitter measures the channels using the channel sounding signals and applies the uplink channel information to downlink channels. This is possible by exploiting the channel reciprocity of TDD between downlink and uplink transmissions.

A scenario where a Base Station (BS) uses a plurality of antennas and a Mobile Station (MS) uses a single antenna is a typical one considered for real implementation of a MIMO system because of the limit of the physical distance between antennas and the complexity and cost of the MS. Nonetheless, this system is called a MIMO system rather than a Multiple-Input Single-Output (MISO) system in that the BS can communicate with a plurality of users, i.e. a plurality of antennas when SDMA, for example, is used. In this scenario, the MS transmits and receives signals in the same manner as done in a conventional single-antenna system and the BS performs transmission and reception in MIMO.

FIG. 1 illustrates an uplink channel sounding scheme for a single-antenna MS.

Referring to FIG. 1, each MS 101 transmits a channel sounding signal distinguishable from those of other MSs to a BS 103. BS 103 measures the uplink channel of MS 101 using the channel sounding signal and uses the measured uplink channel information as downlink channel information in downlink data transmission.

Another scenario for a real MIMO system is that the MS uses a single Transmit (Tx) antenna and two Receive (Rx) antennas. The use of the two Rx antennas offers the benefits that diversity gain increases cell coverage and that as the BS can transmit two streams to the MS, the downlink data rate for the MS increases.

In general, the MS transmits at a far lower power level than the transmit power of the BS due to the lifetime of its battery. Thus, the MS can be designed to have two Rx antennas and one Tx antenna. For example, in the illustrated case of FIG. 2, the MS can use one physical antenna 207 (second antenna) as an Rx antenna and another one 205 (first antenna) for the dual purpose of transmission and reception. In this case, a Tx-Rx switch 203 is provided between the Tx-Rx antenna 205 and a baseband Modulator-Demodulator (MODEM) 201, for switching between transmission and reception.

FIG. 3 illustrates an uplink channel sounding scheme for the above-described multi-antenna MS.

Referring to FIG. 3, an MS 301 transmits channel sounding signals to a BS 303 through the Tx-Rx antenna 205. BS 303 measures uplink channels using the channel sounding signals. However, the measured uplink channel information does not suffice for use as downlink channel information because it is confined to uplink channels between Tx-Rx antenna 205 and BS 303 with no regard to uplink channels between Rx antenna 207 and BS 303.

In the above scenario with one Tx antenna and two Rx antennas in an MS, given $N_t$ antennas in a BS, $2N_t$ downlink channels exist for $N_t$ uplink channels. Therefore, the BS does not get full knowledge of the downlink channels using channel sounding signals received from the MS.

SUMMARY OF THE INVENTION

An aspect of the present invention is to solve at least the above problems and/or disadvantages and to provide at least the advantages below. Accordingly, an aspect of the present invention is to provide an apparatus and method for uplink channel sounding in a wireless communication system.

Another aspect of the present invention is to provide an apparatus and method in an MS with different numbers of Tx antennas and Rx antennas, for transmitting to a BS a channel sounding signal through all antennas that the MS has in a wireless communication system.

In accordance with an aspect of the present invention, there is provided a sounding apparatus for an MS in a wireless communication system, in which a baseband MODEM generates as many channel sounding signals as antennas of the MS and outputs the channel sounding signals to an antenna switch, and the antenna switch switches the channel sounding signals to the antennas in a one-to-one correspondence so as to transmit the channel sounding signals to a BS through all of the antennas of the MS.

In accordance with another aspect of the present invention, there is provided a channel sounding apparatus of a BS in a wireless communication system, in which a channel estimator estimates channels between the antennas of the MS and antennas of the BS upon receipt of channel sounding signals from antennas of an MS, a calculator calculates a preceding matrix according to a predetermined precoding scheme, when the channel estimation is completed on all antennas of the MS and the antennas of the BS, and a precoder multiplies transmission data by the preceding matrix and transmits the multiplied data to the antennas of the MS.

In accordance with a further aspect of the present invention, there is provided a channel sounding method of a BS in a wireless communication system, in which the BS estimates channels between antennas of the MS and antennas of the BS, upon receipt of channel sounding signals from the antennas of an MS, calculates a preceding matrix according to a predetermined precoding scheme, when the channel estimation is completed on all antennas of the MS and the antennas of the BS, multiplies transmission data by the precoding matrix, and transmits the multiplied data to the antennas of the MS.

In accordance with still another aspect of the present invention, there is provided a channel sounding method of an MS in a wireless communication system, in which the MS generates as many channel sounding signals as physical antennas of the MS, and transmits the channel sounding signals to a BS through all of the physical antennas of the MS.

BRIEF DESCRIPTION OF THE DRAWINGS

The above and other objects, features and advantages of the present invention will become more apparent from the following detailed description when taken in conjunction with the accompanying drawings in which:

FIGS. 5A, 5B and 5C illustrate exemplary frame structures according to the present invention;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention discloses an uplink channel sounding apparatus and method in a wireless communication system. The following description of the present invention is made assuming an MS with $N_r$ physical antennas, which transmits signals through the $N_r$ antennas and receives signals through N antennas fewer than the $N_r$ antennas. While the present invention is described in the context that $N_r=2$ and $N=1$, it is obvious that the present invention is applicable to any case with $N<N_r$.

Figure 1:
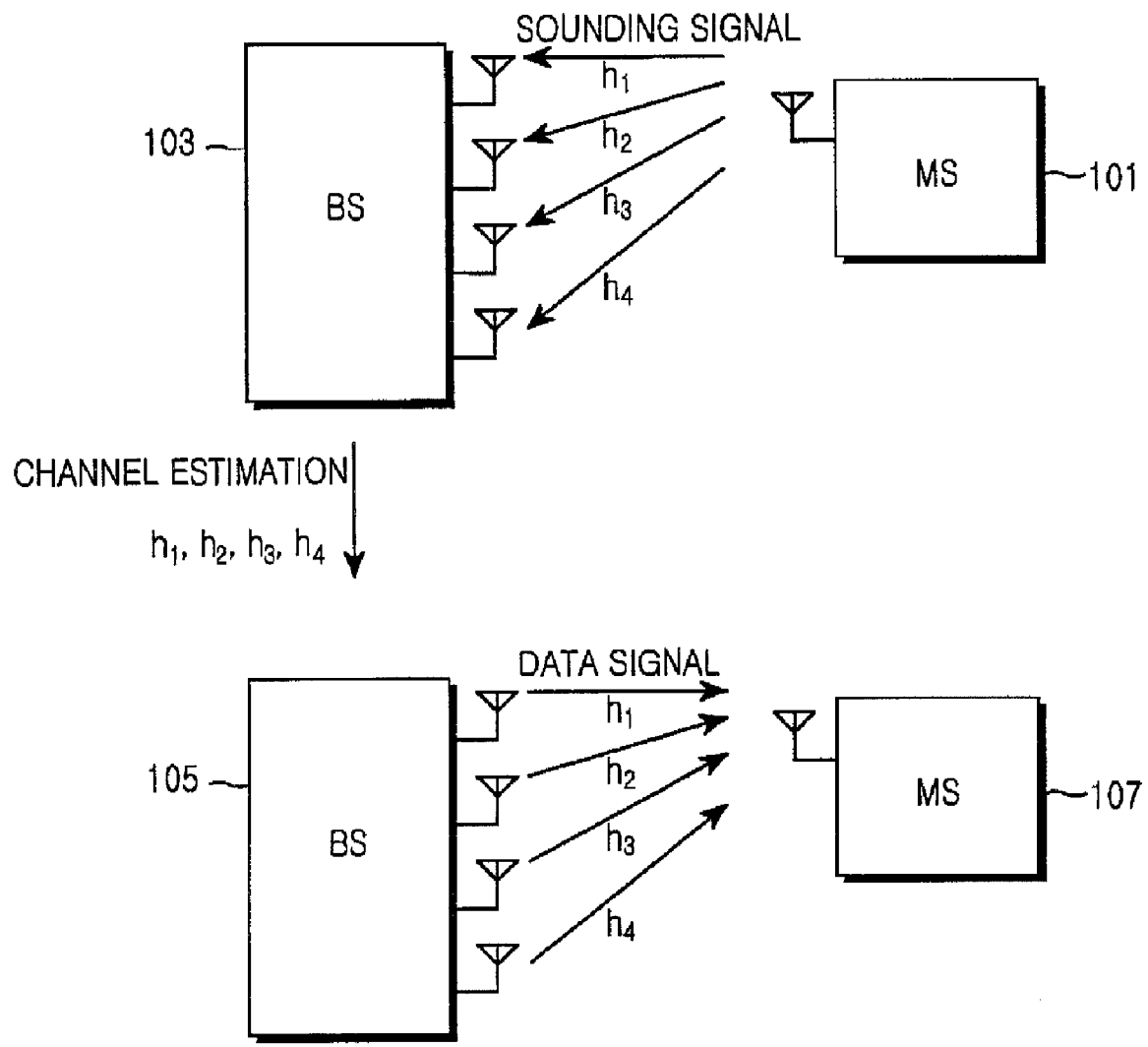
FIG. 1 illustrates an uplink channel sounding scheme for a single-antenna MS.
Figure 2:
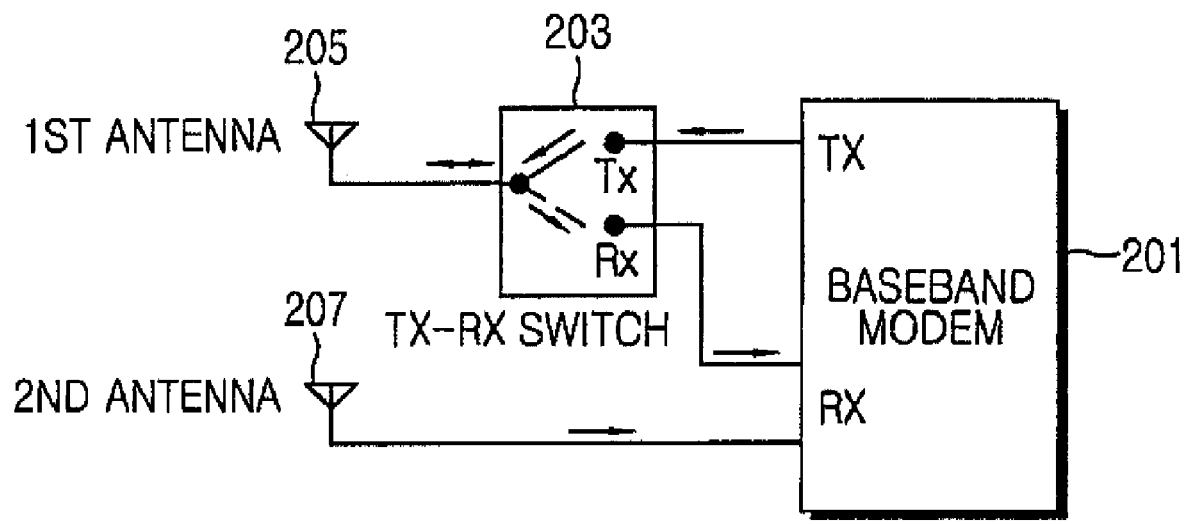
FIG. 2 illustrates Tx and Rx signal paths in a conventional MS with two physical antennas.
Figure 3:
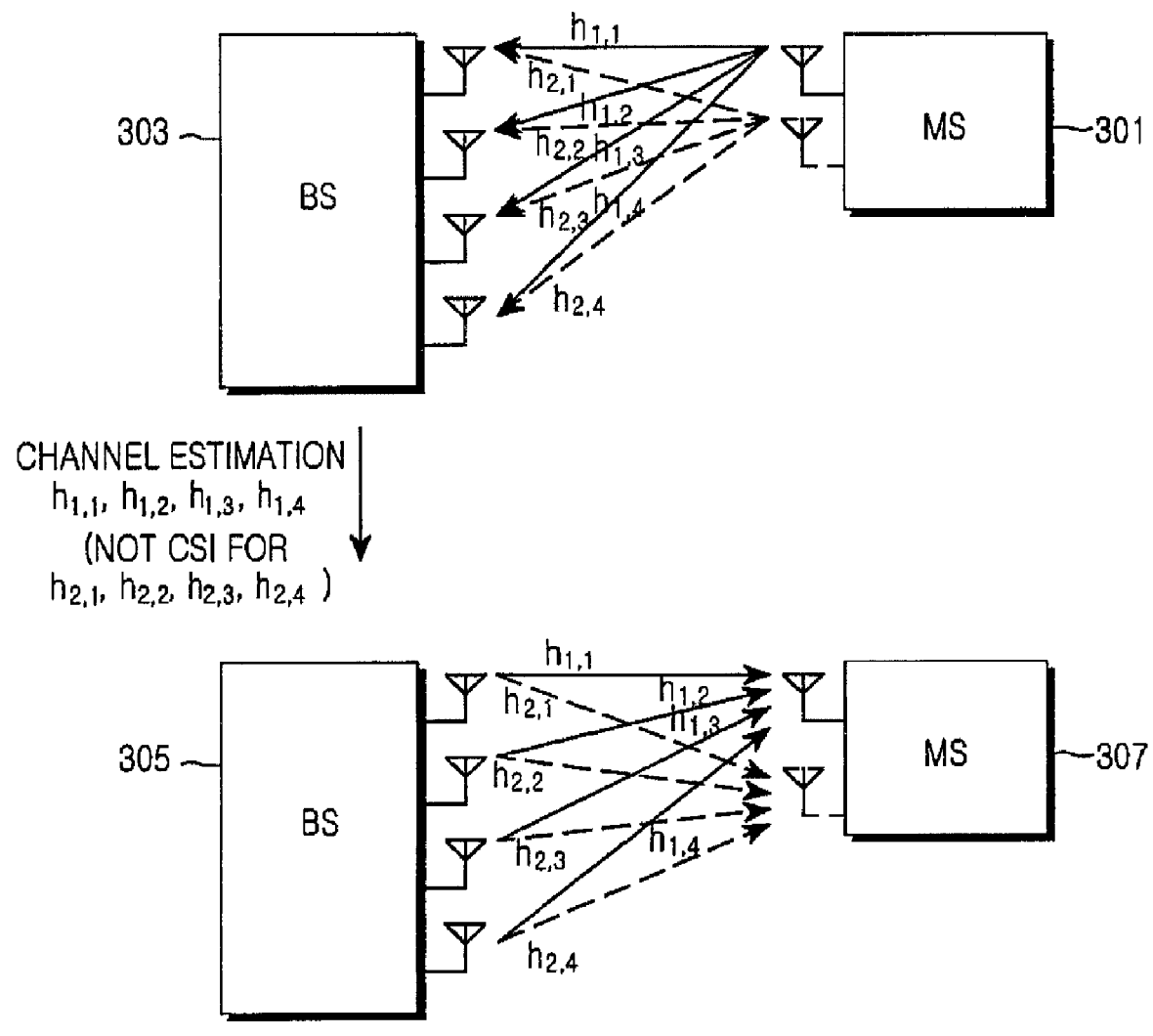
FIG. 3 illustrates an uplink channel sounding scheme for a multi-antenna MS.
Figure 4:
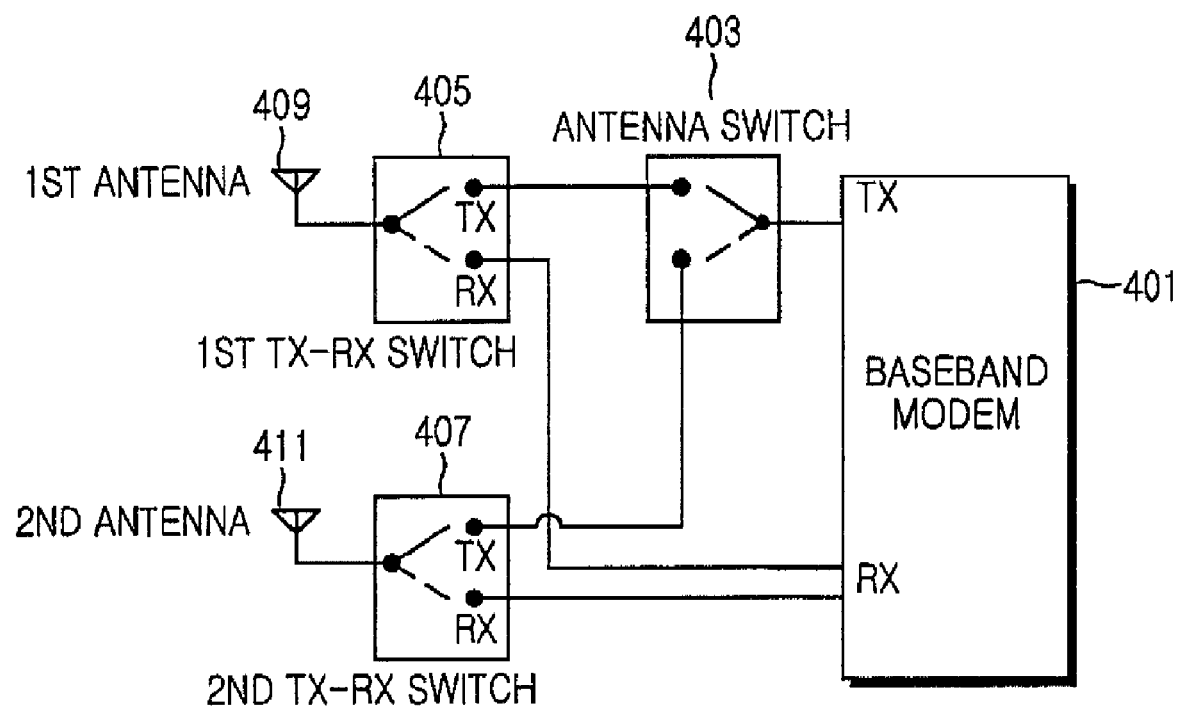
FIG. 4 illustrates Tx and Rx signal paths in an MS with two physical antennas according to the present invention.

Referring to FIG. 4, the MS includes a baseband MODEM 401, an antenna switch 403, a first Tx-Rx switch 405, a second Tx-Rx switch 407, a first antenna 409, and a second antenna 411.

Baseband MODEM 401 generates a data channel signal and channel sounding signals for transmission to a BS and receives a data channel signal from the BS through the first and second Tx-Rx switches 405 and 407.

Upon receipt of the data channel signal from baseband MODEM 401, the antenna switch 403 outputs the data channel signal to first Tx-Rx switch 405. Upon receipt of the channel sounding signals from baseband MODEM 401, antenna switch 403 outputs a first channel sounding signal to first Tx-Rx switch 405 and a second channel sounding signal to second Tx-Rx switch 407.

For transmission, first Tx-Rx switch 405 switches the data channel signal or the first channel sounding signal received from antenna switch 403 to first antenna 409. For reception, first Tx-Rx switch 405 switches a data channel signal received from first antenna 409 to baseband MODEM 401.

For transmission, second Tx-Rx switch 407 switches second channel sounding signal received from antenna switch 403 to second antenna 411. For reception, second Tx-Rx switch 407 switches a data channel signal received through second antenna 411 to baseband MODEM 401.

First antenna 409 transmits the data channel signal or the first channel sounding signal received from first Tx-Rx switch 405 to the BS and outputs a data channel signal received from the BS to first Tx-Rx switch 405.

Second antenna 411 transmits the second channel sounding signal received from second Tx-Rx switch 407 to the BS and outputs a data channel signal received from the BS to second Tx-Rx switch 407.

That is, a data channel signal is transmitted through first antenna 409 only and channel sounding signals are transmitted alternately through the first and second antennas 409 and 411. As described above, the first and second channel sounding signals are transmitted to the BS through first and second antennas 409 and 411, respectively, or vice versa. The switching varies depending on frame structures.

Figure 5A:
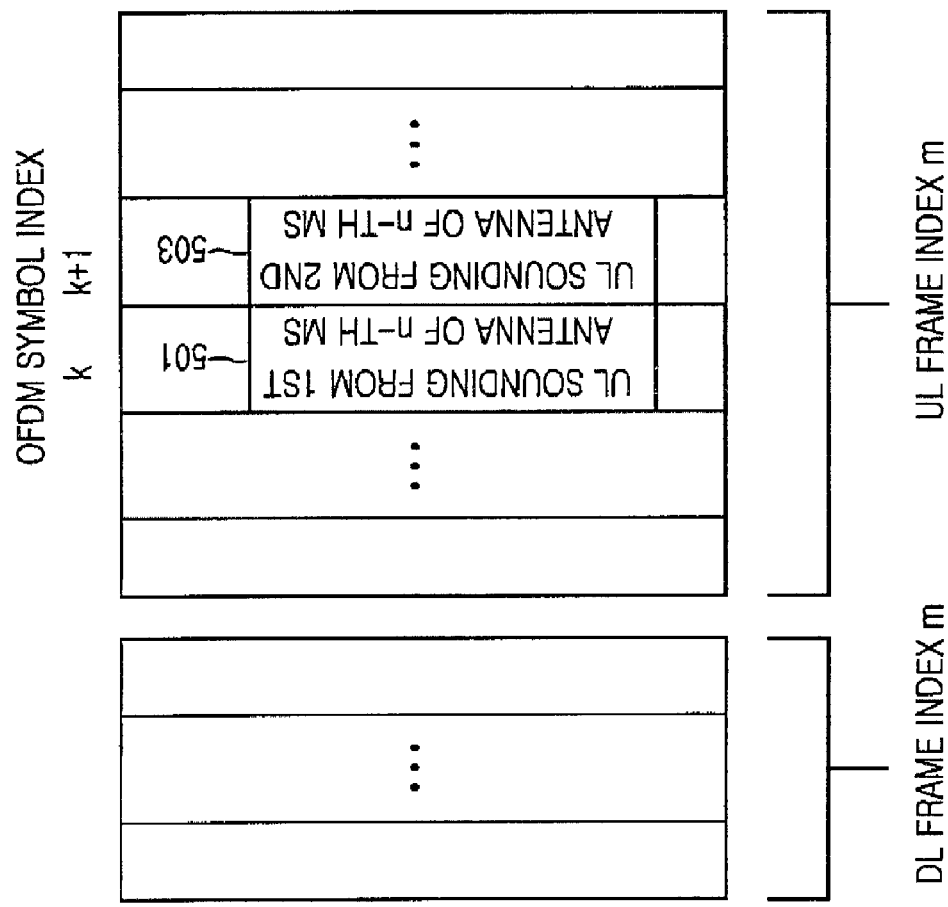
Figure 5B:
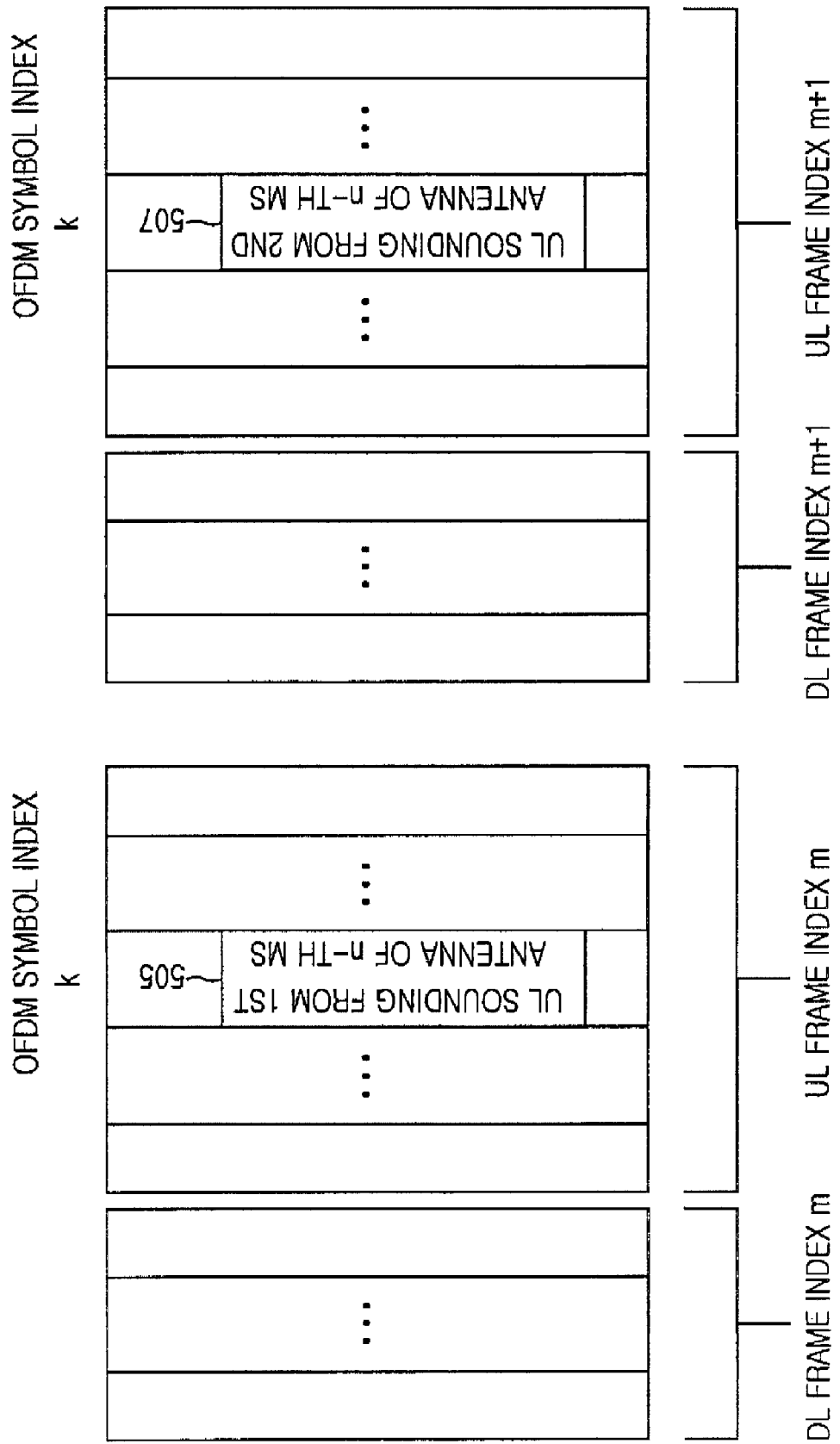

FIGS. 5A, 5B and 5C illustrate exemplary frame structures for a Time Division Duplexing-Orthogonal Frequency Division Multiplexing (TDD-OFDM) system. Thus, each frame is composed of a plurality of OFDM symbols.

Referring to FIG. 5A, if a plurality of symbols (or channels) in an uplink frame are allocated for channel sounding of an MS, the MS transmits a channel sounding signal through a first antenna in a first symbol 501 and through a second antenna in a second symbol 503. In the same manner, the MS transmits the channel sounding signal in the following symbols.

Referring to FIG. 5B, if a single symbol (or channel) per uplink frame is allocated for channel sounding of an MS, the MS transmits a channel sounding signal through a first antenna in a symbol 505 of a frame and through a second antenna in a symbol 507 of the next frame. In the same manner, the MS transmits the channel sounding signal in the following frames.

Referring to FIG. 5C, if a plurality of subcarriers in an uplink frame are allocated for channel sounding of an MS, the MS transmits a channel sounding signal through a first antenna on one half of the subcarriers and through a second antenna in the other half of the subcarriers.

Figure 6:
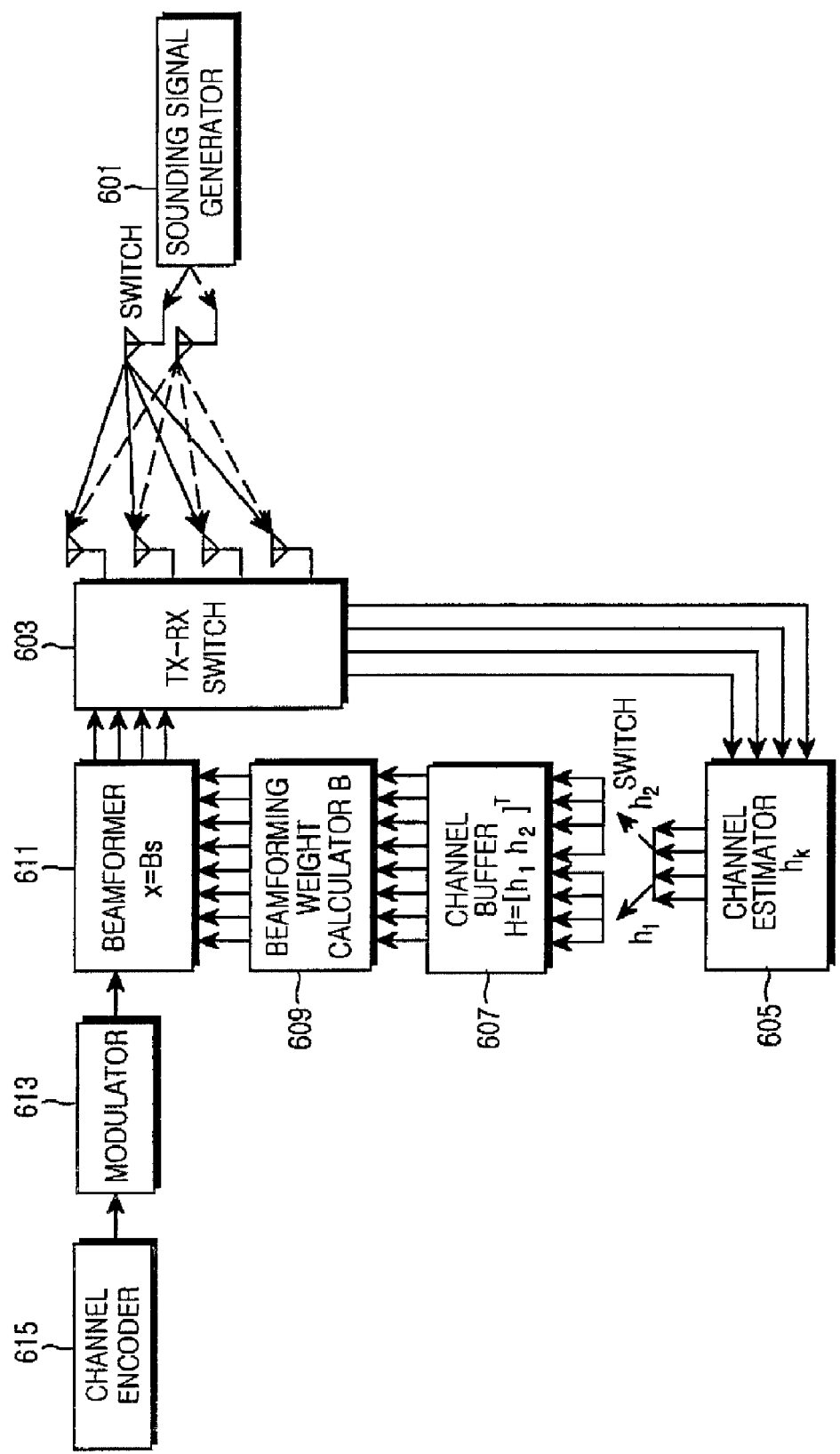
FIG. 6 is a block diagram of a BS receiver using beamforming according to the present invention.

Referring to FIG. 6, the BS receiver includes a Tx-Rx switch 603, a channel estimator 605, a channel buffer 607, a beamforming weight calculator 609, a beamformer 611, a modulator 613, and a channel encoder 615. Tx-Rx switch 603 switches a channel sounding signal received from the first or second antenna of an MS to channel estimator 605. The MS switches the channel sounding signal generated from a sounding signal generator 601 to be transmitted to the BS.

Channel estimator 605 estimates channels between the antennas of the BS and the first/second antenna of the MS using the received channel sounding signal and provides the channel estimates $h_k$ (k is the index of an antenna in the MS) to channel buffer 607.

Channel buffer 607 buffers channel estimates with respect to the respective antennas of the MS. When receiving all channel estimates for the MS, channel buffer 607 outputs the channel estimates to beamforming weight calculator 609 with a channel matrix H as shown in Equation (1).

$$H=[h_1, h_2]^T \quad (1)$$

Beamforming weight calculator 609 calculates beamforming weight values B based on the channel matrix H and provides the beamforming weight values B to the beamformer 611.

Channel encoder 615 channel-encodes a data signal received from an upper layer at a predetermined code rate. Channel encoder 615 can be a convolutional encoder, a turbo encoder, a Low Density Parity Check (LDPC) encoder, or a Convolutional Turbo encoder (CTC), for example.

Modulator 613 modulates the coded data received from channel encoder 615 in a predetermined modulation scheme by mapping the coded data to complex signal points on a predetermined constellation. The modulation scheme can be Binary Phase Shift Keying (BPSK), Quadrature Phase Shift Keying (QPSK), 8-ary Quadrature Amplitude Modulation (8QAM), 16-ary QAM (16QAM), or 64-ary QAM (64QAM). One bit (s=1) is mapped to one complex signal in BPSK, two bits (s=2) to one complex signal in QPSK, three bits (s=3) to one complex signal in 8QAM, four bits (s=4) to one complex signal in 16QAM, and six bits (s=6) to one complex signal in 64QAM.

Beamformer 611 duplicates the modulation signal s to as many modulation signals for transmit antennas and performs beamforming for the respective antennas by multiplying the modulation signals by the beamforming weight values B. Tx-Rx switch 603 transmits the beams to the MS through the Tx antennas.

Figure 7:
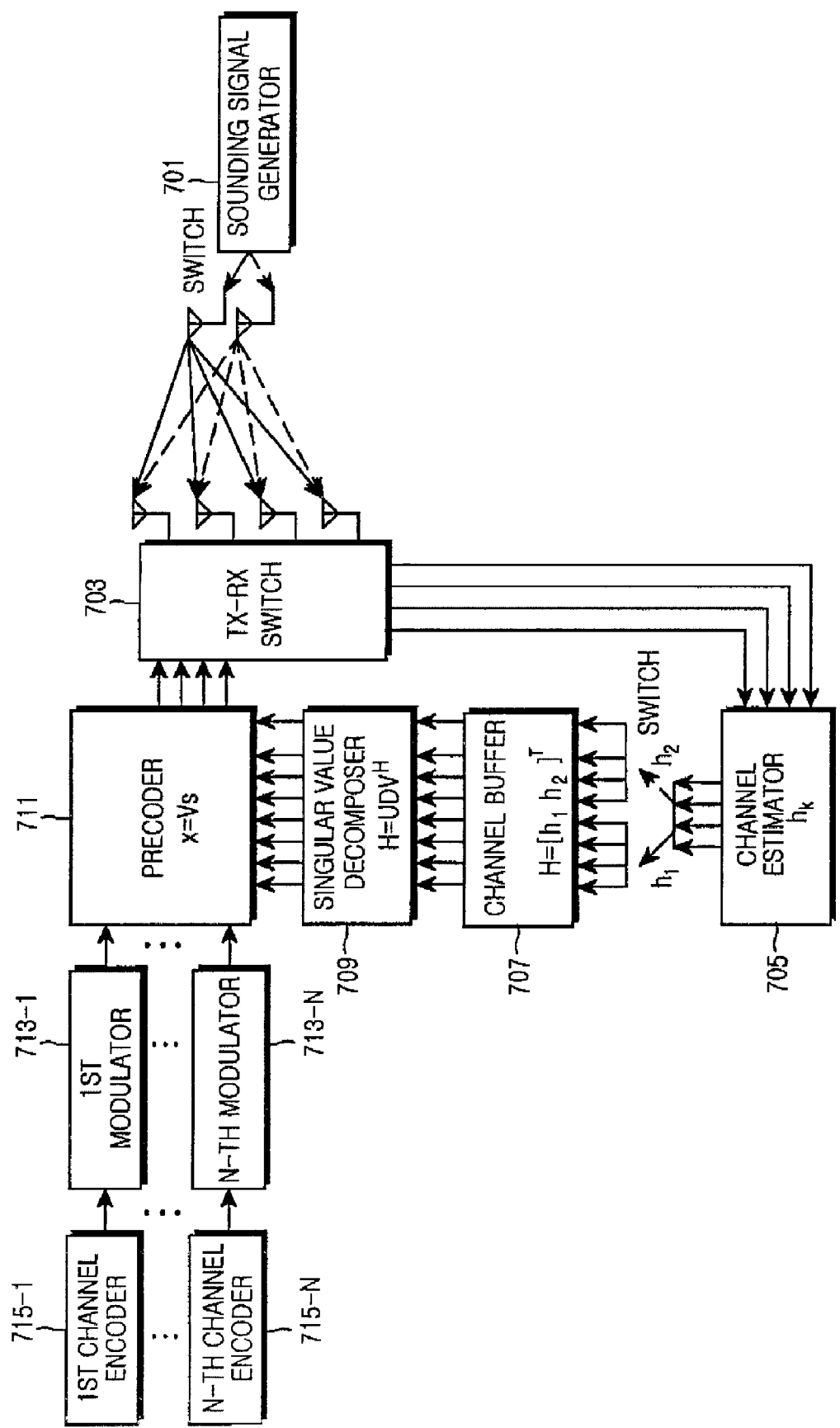
FIG. 7 is a block diagram of a BS receiver using SVD according to the present invention.

Referring to FIG. 7, the BS receiver includes a Tx-Rx switch 703, a channel estimator 705, a channel buffer 707, a singular value decomposer 709, a precoder 711, a first to $N^{th}$ modulators 713-1 to 713-N, and a first to $N^{th}$ channel encoders 715-1 to 715-N.

Singular value decomposer 709 calculates a precoding matrix V by performing SVD on a channel matrix H associated with an MS received from channel buffer 707. The SVD is given by Equation (2), $$H=UDV^H \quad (2)$$

The SVD operation decomposes the channel matrix H into two unitary matrices U and V and a diagonal matrix D. The matrices U and V are the left and right eigenvector unitary matrices of the matrix H, respectively. The matrix D is a diagonal matrix with eigenvalues of the matrix H.

Precoder 711 generates a plurality of data signals x by multiplying the precoding matrix V by modulated data signals s received from the first to $N^{th}$ modulators 713-1 to 713-N and provides the data signals in correspondence with a plurality of Tx antennas to Tx-Rx switch 703. Tx-Rx switch 703 transmits the data signals to the MS through the respective Tx antennas.

While beamforming and SVD have been described with reference to FIGS. 6 and 7, SDMA and other precoding techniques are also available.

Figure 8:
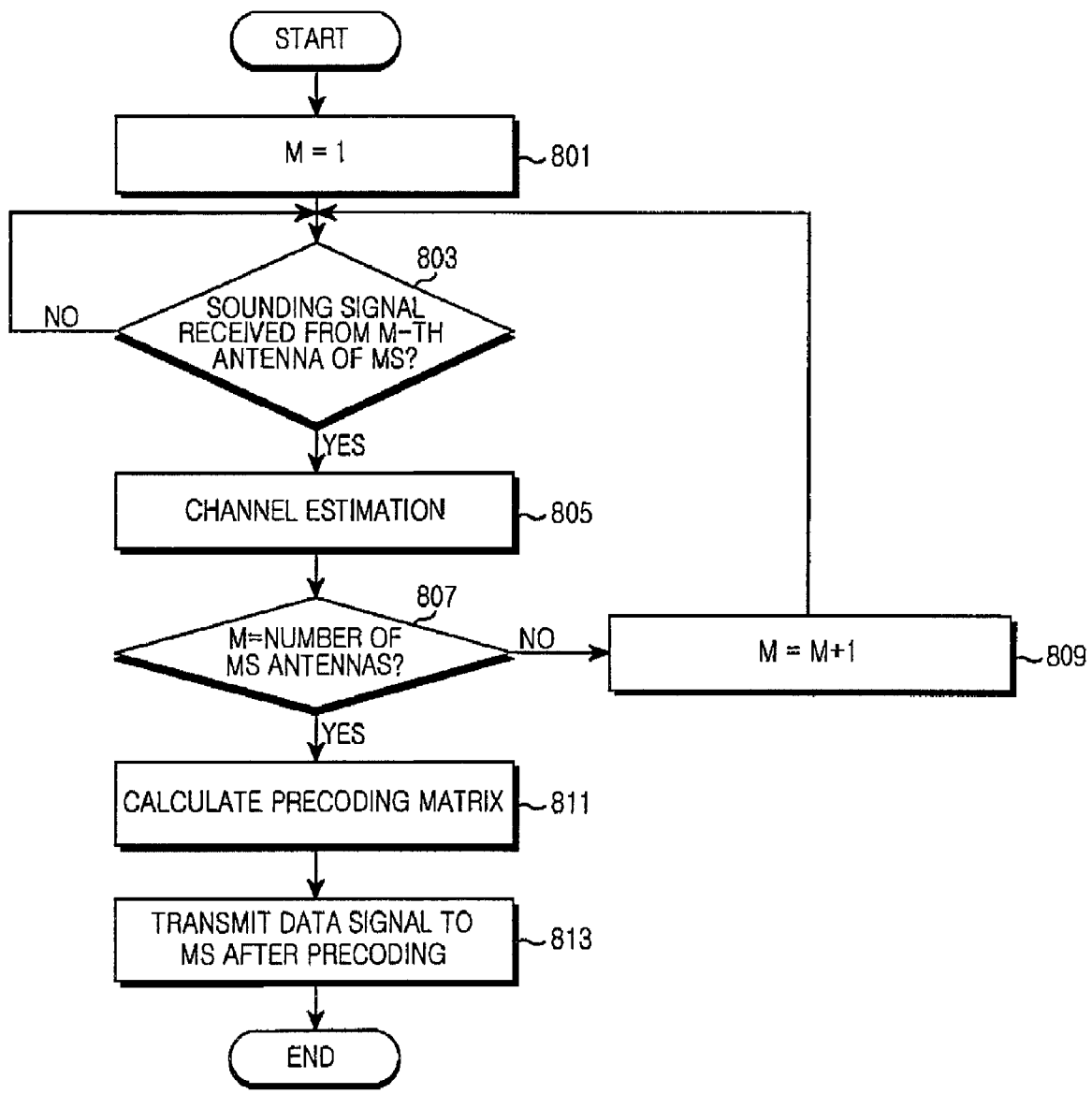
FIG. 8 is a flowchart of a procedure for estimating channels using channel sounding signals received from an MS and transmitting data to the MS according to the channel estimation in a BS according to the present invention.

Referring to FIG. 8, the BS first makes a decision as to whether to transmit data in a closed-loop MIMO technique such as beamforming, SVD, SDMA, etc. The decision can be made by the MS and then the MS requests closed-loop MIMO transmission to the BS. Alternatively, the BS makes the decision based on information received from the MS. Once the closed-loop MIMO transmission is decided, the BS allocates part of uplink channels in a frame for use as sounding channels to the MS. The MS transmits a sounding signal through a first antenna and then through a second antenna on the allocated channels.

The BS sets the index M of an antenna of the MS to 1 in step 801 and monitors reception of a sounding signal from the $M^{th}$ antenna of the MS in step 803. Upon receipt of a sounding signal from the $M^{th}$ antenna of the MS, the BS estimates channels $h_M$ between the $M^{th}$ antenna of the MS and the antennas of the BS in step 805. If the BS has four antennas, $h_1$ is a 1×4 vector.

In step 807, the BS compares M with the number of antennas in the MS. If M is different from the number of antennas of the MS, the BS increases M by 1 in step 809 and returns to step 803. On the other hand, if M is equal to the number of antennas in the MS, the BS generates a channel matrix H using all channel estimates $h_M$ and calculates a precoding matrix using the channel matrix H in step 811. Then, the BS precodes data signals by multiplying them by the preceding matrix and transmits the precoded signals to the MS through the antennas in step 813. The BS then ends the procedure of the present invention.

Figure 9:
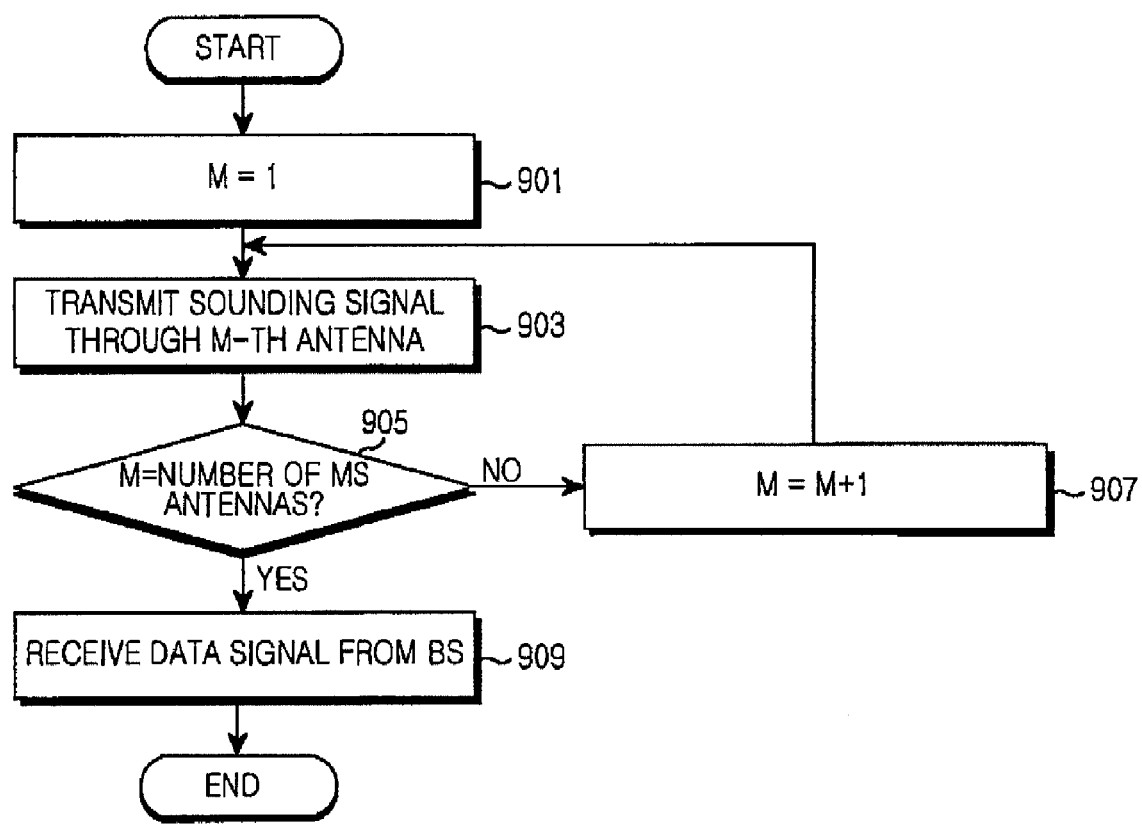
FIG. 9 is a flowchart of a procedure for transmitting channel sounding signals to the BS in the MS according to the present invention.

Referring to FIG. 9, the MS sets the index M of its antenna to 1 in step 901 and transmits a sounding signal through an $M^{th}$ antenna on a sounding channel allocated by the BS in step 903. In step 905, the MS compares M with the number of its antennas. If M is different from the number of antennas of the MS, the MS increases M by 1 in step 907 and returns to step 903. On the other hand, if M is equal to the number of antennas in the MS, the MS receives a data signal from the BS, considering that all sounding signals have been transmitted to the BS in step 909. Then, the MS ends the procedure of the present invention.

Meanwhile, the present invention is also applicable to uplink MIMO transmission as well as downlink MIMO transmission. For instance, if a multi-antenna MS uses an antenna selection technique, a sounding signal received at the BS can be a criterion for selecting an MS antenna. That is, the BS selects an antenna with a good channel among channels estimated using the sounding signal and feeds back the antenna selection information to the MS. The MS then transmits a data signal through the selected antenna.

As described above, the present invention provides an uplink channel sounding apparatus and method in a wireless communication system. When an MS transmits a channel sounding signal to provide downlink channel information to a BS in a TDD-MIMO system, the present invention solves the problem that the BS lacks information for the channels between every pair of antennas, caused by the use of different numbers of Tx and Rx antennas in an MS. Further, since the present invention enables accurate downlink channel estimation, system performance is improved.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A channel sounding apparatus for a Mobile Station (MS) in a wireless communication system, comprising:
   a baseband Modulator-Demodulator (MODEM) for generating as many channel sounding signals as the MS has antennas and outputting the channel sounding signals to an antenna switch; and
   the antenna switch for switching the channel sounding signals to the antennas in a one-to-one basis and transmitting the channel sounding signals to a Base Station (BS) through all of the antennas of the MS,
   wherein the antennas include a data transmit and receive antenna and a data receive antenna,
   further comprising at least one antenna for transmitting a channel sounding signal received from the antenna switch to the BS in an allocated uplink period, wherein the channel sounding signals are allocated to one of a plurality of symbols and a plurality of channels in an uplink frame, and wherein the antenna switch transmits a channel sounding signal through an antenna in a first symbol, transmits a channel sounding signal through another antenna in a second symbol, and transmits channel sounding signals through remaining antennas in remaining symbols in the same manner.

2. The channel sounding apparatus of claim 1, further comprising a transmission-reception switch for each of the antennas, connected between the antenna switch and each antenna, for switching the channel sounding signal received from the antenna switch to each antenna and switching a data signal received from each antenna to the baseband MODEM.

3. The channel sounding apparatus of claim 1, wherein the baseband MODEM outputs a data signal to the antenna switch.

4. The channel sounding apparatus of claim 3, wherein the antenna switch switches the data signal to the data transmit and receive antenna.

5. The channel sounding apparatus of claim 4, further comprising:
  a transmission-reception switch for the data transmit and receive antenna, connected between the antenna switch and the data transmit and receive antenna, for switching one of a data signal and a channel sounding signal received from the antenna switch to the data transmit and receive antenna and switching a data signal received from the data transmit and receive antenna to the baseband MODEM;
  a transmission-reception switch for the data receive antenna, connected between the antenna switch and the data receive antenna, for switching a channel sounding signal received from the antenna switch to the data receive antenna and switching a data signal received from the data receive antenna to the baseband MODEM;
  the data transmit and receive antenna for transmitting one of the channel sounding signal and the data signal received from the transmission-reception switch for the data transmit and receive antenna to the BS in an allocated uplink period and outputting a data signal received from the BS to the transmission-reception switch for the data transmit and receive antenna; and
  the data receive antenna for transmitting the channel sounding signal received from the transmission-reception switch for the data receive antenna to the BS in an allocated uplink period and outputting a data signal received from the BS to the transmission-reception switch for the data receive antenna.

6. The channel sounding apparatus of claim 1, wherein the channel sounding signals are allocated to one of a symbol and a channel in an uplink frame.

7. The channel sounding apparatus of claim 6, wherein the antenna switch transmits a channel sounding signal through an antenna in one of the symbol and the channel of a frame, transmits a channel sounding signal through another antenna in one of the symbol and the channel of a next frame, and transmits channel sounding signals through remaining antennas in one of the symbols and channels of following frames in the same manner.

8. The channel sounding apparatus of claim 1, wherein the channel sounding signals are allocated to a plurality of sub-carriers in an uplink frame.

9. The channel sounding apparatus of claim 8, wherein the antenna switch transmits a channel sounding signal through an antenna in part of the subcarriers, transmits a channel sounding signal through another antenna in another part of the subcarriers, and transmits channel sounding signals through remaining antennas in remaining parts of the subcarriers in the same manner.

10. A channel sounding method of a Mobile Station (MS) in a wireless communication system, comprising:
  generating as many channel sounding signals as the MS has physical antennas ; and
  transmitting the channel sounding signals to a Base Station (BS) through all of the physical antennas of the MS,
  wherein the physical antennas include a data transmit and receive antenna and a data receive antenna,
  wherein the channel sounding signals are allocated to one of a symbol and a channel in an uplink frame,
  wherein the transmitting step comprises transmitting the channel sounding signal through an antenna in one of the symbol and the channel of a frame, transmitting the channel sounding signal through another antenna in one of the symbol and the channel of a next frame, and transmitting channel sounding signals through remaining antennas in one of the symbols and channels of following frames in the same manner.

11. The channel sounding method of claim 10, wherein the channel sounding signals are allocated to one of a plurality of symbols and a plurality of channels in an uplink frame.

12. The channel sounding method of claim 11, wherein the transmitting step comprises transmitting a channel sounding signal through an antenna in a first symbol, transmitting a channel sounding signal through another antenna in a second symbol, and transmitting channel sounding signals through remaining antennas in remaining symbols in the same manner.

13. The channel sounding method of claim 10, wherein the channel sounding signals are allocated to a plurality of sub-carriers in an uplink frame.

14. The channel sounding method of claim 13, wherein the transmitting step comprises transmitting a channel sounding signal through an antenna in part of the subcarriers, transmitting a channel sounding signal through another antenna in another part of the subcarriers, and transmitting channel sounding signals through remaining antennas in remaining parts of the subcarriers in the same manner.

15. A channel sounding apparatus for a Mobile Station (MS) in a wireless communication system, comprising:
  means for generating as many channel sounding signals as the MS has antennas; and
  means for switching the generated channel sounding signals to the antennas in a one-to-one basis,
  wherein the antennas include a data transmit and receive antenna and a data receive antenna,
  wherein the channel sounding signals are allocated to one of a plurality of symbols and a plurality of channels in an uplink frame,
  wherein the switching means transmits the channel sounding signal through an antenna in a first symbol, transmits a channel sounding signal through another antenna in a second symbol, and transmits channel sounding signals through remaining antennas in remaining symbols in the same manner.

* * * * *